United States Patent [19]

Hausmann

[11] 3,916,237

[45] Oct. 28, 1975

[54] D-C MICROMOTOR WITH IMPROVED COMMUTATOR

[75] Inventor: Emile Hausmann, La-Chaux-de-Fonds, Switzerland

[73] Assignee: Portescap, La Chaux-de-Fonds, Switzerland

[22] Filed: Apr. 18, 1974

[21] Appl. No.: 462,125

Related U.S. Application Data

[63] Continuation of Ser. No. 314,807, Dec. 13, 1974.

[52] U.S. Cl. .............................................. 310/236
[51] Int. Cl.² ........................................ H02K 13/04
[58] Field of Search .......... 310/233, 234, 235, 236, 310/220, 43, 224, 244, 219, 45, 46, 231, 228, 225, 40 MM

[56] References Cited
UNITED STATES PATENTS

| | | |
|---|---|---|
| 497,123 | 5/1893 | Hassan .............................. 310/219 |
| 1,792,022 | 2/1931 | Luis .................................. 310/236 |
| 2,555,997 | 6/1951 | Portail .............................. 310/219 |
| 3,126,618 | 3/1964 | Sharrow ............................ 310/233 |
| 3,303,370 | 2/1967 | Boes ................................. 310/228 |
| 3,456,143 | 7/1969 | Uemura ............................ 310/220 |

FOREIGN PATENTS OR APPLICATIONS

| | | |
|---|---|---|
| 82,678 | 11/1919 | Switzerland ....................... 310/233 |
| 81,205 | 5/1919 | Switzerland ....................... 310/233 |

*Primary Examiner*—R. Skudy
*Attorney, Agent, or Firm*—Curtis, Morris & Safford

[57] ABSTRACT

A D.C. micromotor having multiple bars arranged on a commutator attached to the rotor shaft in an overlapping manner such that with the rotation of the rotor each commutator brush remains momentarily in contact with the end of one commutator bar as it first contacts the next succeeding commutator bar.

4 Claims, 4 Drawing Figures

Fig. 3
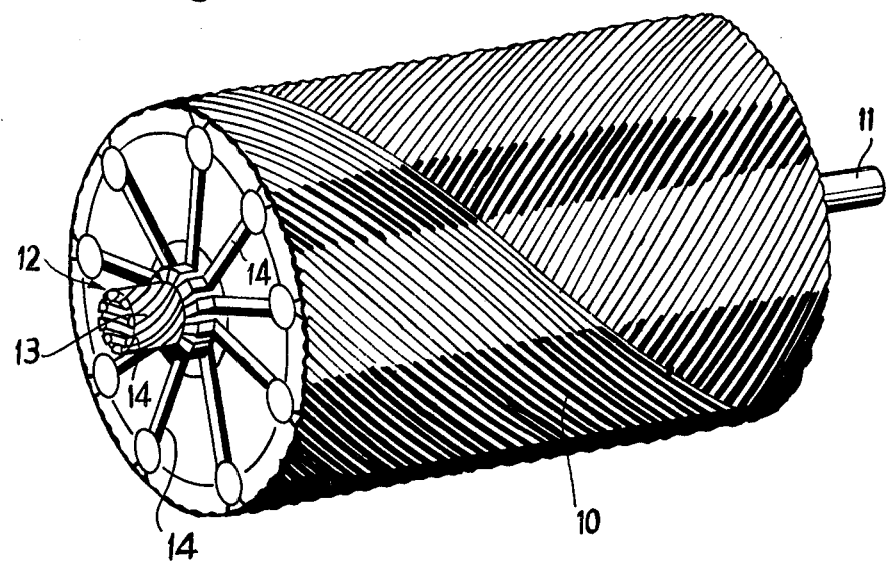
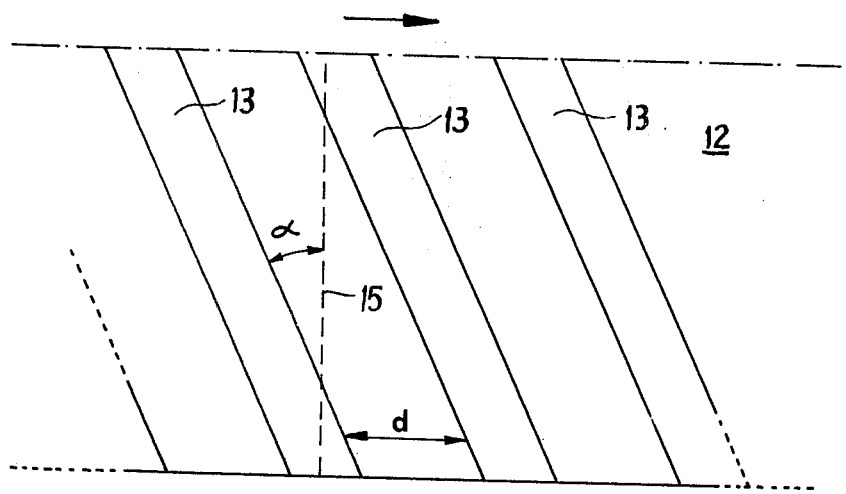
Fig. 4

D-C MICROMOTOR WITH IMPROVED COMMUTATOR

This is a continuation of application Ser. No. 314,807, filed Dec. 13, 1974.

BACKGROUND OF THE INVENTION

The present invention relates to D.C. motors of the type having rotors comprising a winding connected to the bars of a commutator which cooperate with stationary brushes. Such motors having a power of less than about 50 watts are generally known as micromotors.

In known motors of this type, the consecutive commutator bars are separated in the direction of rotation of the commutator, that is to say, in the direction of the passage of the brushes, by spaces or by insulating material. The brushes are elastically biased against the commutator and have a very small contact surface in order to reduce friction. In such an arrangement, the radius of the commutator along the path of the brushes is never entirely constant. For instance, when the bars are incorporated by molding in an insulating material forming the body of the commutator, the radius at the place of separation of the bars is generally less than that of bars worked on a lathe. The brushes thus undergo a radial displacement with respect to the axis of the commutator at the time of the switching, that is to say, upon the passage from one bar to the next succeeding bar. This results in a separation of the brushes from the commutator bars at the time of switching, and therefore the formation of electric arcs which cause erosion of the bars. In fact, the breaking of the electrical contact upon the passage of a brush from one bar to the following bar creates a counter-electromotive force due to the self-induction of the winding and thus increases the amperage in the sparks which are produced. The erosion of the commutator and, secondly, the wear by friction to which it is subjected constitute rather serious drawbacks in that they shorten the life of the motor. Moreover, the sparks are a source of interference which may disturb electronic circuits present in the vicinity of the motor.

SUMMARY OF THE INVENTION

The above and other disadvantages are overcome by the present invention of a micromotor characterized by the fact that the surfaces of the commutator bars are formed of portions of the cylindrical envelope of the commutator, the shape and arrangement of which are such that each of the generatrices of the envelope intersects a single bar surface, with the exception of the generatrices which intersect the end portions of the bars, seen in the direction of rotation of the commutator, which intersect two consecutive bars of the commutator so that each of the brushes, upon passage from one bar to the following bar, simultaneously rubs against the rear end of the bar which it is leaving and against the front end of the next succeeding bar.

In accordance with one preferred embodiment of the invention, the surfaces of the commutator bars are segments of coaxial, cylindrical zones of the same radius, staggered along the axis of rotation of the rotor, with the ends of two consecutive segments being overlapped in the direction of rotation of the rotor in such a manner that only the generatrices which intersect the ends of the segments intersect two consecutive segments.

The surfaces of the bars according to another embodiment of the invention constitute, in the plane of development of the envelope of the commutator, parallelograms whose long sides are all parallel to each other and which form an acute angle with the generatrices. The space between the parallelograms is such that only the generatrices which intersect the end portions of the bars intersect two consecutive bars.

In both embodiments the portions of the commutator against which the brushes rub beyond the surfaces of the segments are formed of a self-lubricating plastic material or of a porous plastic material which is impregnated with a lubricant.

It is therefore an object of the invention to provide a DC micromotor having commutator bars arranged in a staggered fashion to eliminate arcing as the commutator brushes pass from one bar to the next.

It is another object of the invention to provide a D.C. micromotor commutator which lubricates the brushes and the bars.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 3 is a perspective view of the rotor and commutator of a second embodiment of the invention; and FIG. 4 is a diagrammatic, developed view of a portion of the cylindrical envelope of the commutator of the motor of FIG. 3.

DESCRIPTION OF CERTAIN PREFERRED EMBODIMENTS

Figure 1:
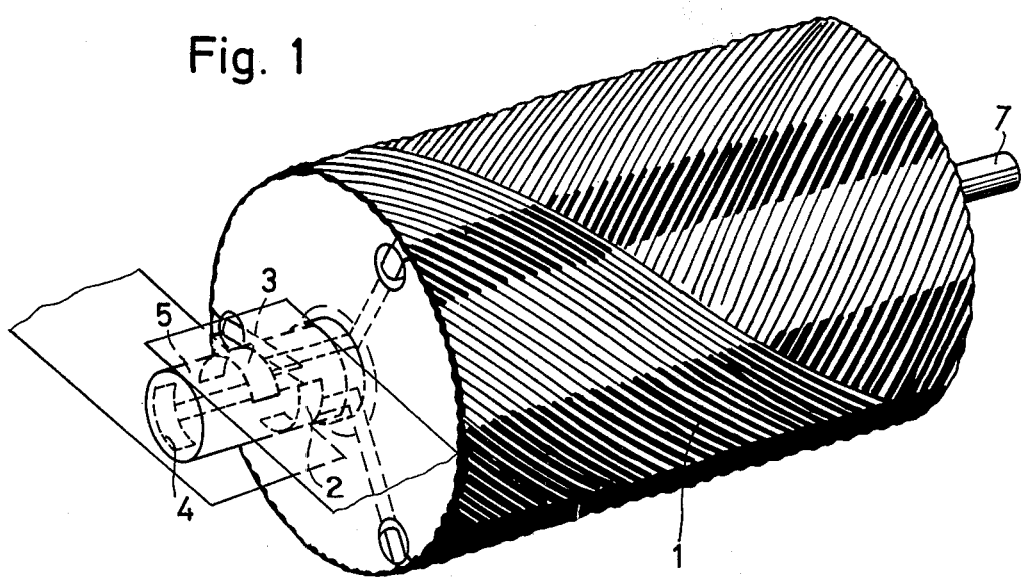
FIG. 1 is a perspective view of a rotor and a commutator of a first embodiment of the invention.

The rotor shown in perspective in FIG. 1 comprises a winding 1 formed of three coils connected in series, the junctions of which are connected to the bar segments 2, 3 and 4 of the commutator 5 attached to the rotor shaft 7. The body of this commutator 5 is made of plastic such as a self-lubricating material, and preferably of frittered polyamides such as are marketed, for instance, under the tradename "Nylasint." In this latter case, the commutator is obtained from Nylasint powder by cold pressing the segments 2, 3 and 4 of the commutator in a mold and their connection portions are incorporated in the part by this same operation. The support for the segments then has a porosity which permits its impregnation with a lubricant such as is currently used for electrical contacts.

The segments forming the bars of the commutator are portions of cylindrical rings whose radii correspond to that of the surface of the commutator and they are arranged coaxially but are staggered in the direction of the axis of rotation of the commutator 5.

Figure 2:
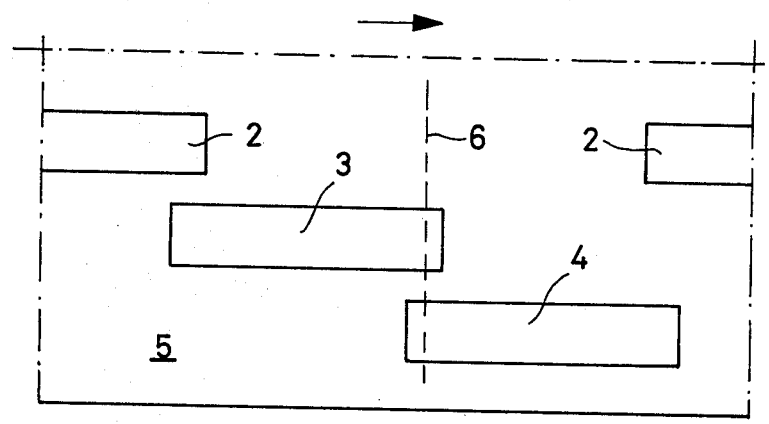
FIG. 2 is a diagrammatic, developed view of a portion of the cylindrical surface of the commutator of the motor of FIG. 1.

The arrangement of the segments is shown in the developed view of the surface of the commutator in FIG. 2 in which the surfaces of the segments 2, 3 and 4 are in the form of rectangles. Instead of being placed, as in known motors, in the same cylindrical zone with their small sides (ends) facing each other a short distance apart, the segments of the invention occupy parallel zones and their ends are shifted in the direction of rotation of the commutator, as indicated by the arrow, so as to intersect a common line or generatrix such as 6 at the surface of the commutator and parallel to the axis of rotation of the commutator. The brushes 8 rub against the commutator presenting a contact surface which, in the ideal case, is reduced substantially to a generatrix of the commutator. In the position of the generatrix 6, a brush still rests against the segment 4 which it is about to leave and has just come into contact with the segment 3. It is therefore, in this intermediate switching position, simultaneously in contact with two consecutive segments.

Thus, from a mechanical standpoint, the brushes rest at each moment against at least one segment surface, that is to say, against a cylindrical surface of very precisely constant radius. This avoids a separation of the brushes from the commutator and therefore the production of sparks due to such separation. By the same measure, the noise caused by a radial movement of the brushes is considerably reduced.

From an electrical standpoint, the coil connected between two consecutive segments is short-circuited via the contact resistors (not shown) by the brush and there is no breaking of the circuit upon the passage of the brush from one segment to the other. The formation of sparks is thus substantially decreased, for this reason also.

The stagger of the segments of the commutator in the direction of the axis of rotation furthermore makes it possible to use the rest of the surface of the cylindrical zone which is not occupied by the corresponding segment, for lubricating the switch. The use of a porous material impregnated with a lubricant makes it possible not only to lubricate the contact surface of the brush over the greatest part of the path which it travels, that is to say, outside the segment, but it also leads to a lubrication of the segment itself, the brush feeding lubricant from the adjacent insulating surface of the commutator.

Referring now to FIG. 3 another embodiment of the invention is shown including a rotor winding 10 formed of nine coils (not shown) mounted on a rotor shaft 11. The corresponding commutator 12 comprises nine bars 13 connected to the winding by connecting portions 14. The shape of these bars can be noted from the portion of the developed view of the cylindrical surface of the commutator shown in FIG. 4. In accordance with this embodiment, the bars 13 in the developed surface have the appearance of parallelograms arranged in parallel, the long sides of which form an acute angle α with the generatrices 15. The distance d between two bars in the direction of rotation of the commutator, indicated by the arrow, is selected as a function of the angle α, of the length of the brushes 18 that is to say, of their length in the direction along the axis of rotation of the contact surface, and of the desired overlap, in such a manner that in the position of the generatrix 15, for instance, a brush is simultaneously in contact with two consecutive bars.

The embodiments described make it possible to assure excellent conditions in the operation of the D.C. micromotor by improving the continuity of contact, the switching and the lubrication. The reduction of the noise and of the interference produced by the motor, and particularly the increase in the life of the motor, are the immediate consequences of the invention.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An improved micromotor of the type having a rotor with at least one winding connected to the bars of a cylindrical commutator, the bars cooperating with stationary brushes, wherein the improvement comprises a plurality of spaced apart commutator bars having surfaces coextensive with the cylindrical envelope of the commutator, the surfaces of said bars comprising generally rectangular segments of coaxial cylindrical zones of the same radii staggered in the direction of the axis of rotation of the commutator with the end portions of the bar surfaces of consecutive bars overlapping as viewed in the direction of the axis of rotation of the commutator, said bar surfaces being spaced from each other along the axis of rotation of the commutator and in the direction of rotation of the commutator such that lines parallel to the axis of rotation of the commutator which intersect the end portions of the bar surfaces intersect two consecutive staggered surfaces, each of the brushes being of sufficient width to overlie at least two consecutive bars so that, upon passage from one bar to a following bar, each said brush rubs simultaneously against the rear end of the bar which it is leaving and against the front end of the following bar.

2. An improved micromotor as recited in claim 1, wherein the portions of the commutator against which the brushes rub outside the surfaces of the bars are formed of a self-lubricating plastic.

3. An improved micromotor as recited in claim 1, wherein the portions of the commutator against which the brushes rub outside the surfaces of the bars are formed of a porous plastic impregnated with a lubricant.

4. An improved micromotor of the type having a rotor with at least one winding connected to the bars of a cylindrical commutator, the bars cooperating with stationary brushes, wherein the improvement comprises a plurality of spaced apart commutator bars having surfaces coextensive with the cylindrical envelope of the commutator, the surfaces of said bars comprising generally rectangular segments of coaxial cylindrical zones of the same radius staggered in the direction of the axis of rotation of the commutator, each generally rectangular segment exhibiting a longer dimension wrapped about the cylindrical commutator envelope in the direction of rotation of said commutator, said bar surfaces being spaced from each other along the axis of rotation of the commutator and in the direction of rotation of the commutator, consecutive bar surfaces having end portions that overlap as viewed in the direction of the commutator axis of rotation; the portions of said commutator outside the bar surfaces being formed of a porous plastic material impregnated with a lubricant, each of the brushes being of sufficient width to overlie at least two consecutive bars so that, upon passage from one bar to a following bar, each said brush rubs simultaneously against the rear end of the bar which it is leaving and against the front end of the following bar, thereby substantially eliminating radial movement of the brushes while simultaneously lubricating the contact surface of the brush during its entire path of travel and lubricating the bar surfaces themselves.

* * * * *